United States Patent
Maslov et al.

(10) Patent No.: US 6,727,668 B1
(45) Date of Patent: Apr. 27, 2004

(54) PRECISION BRUSHLESS MOTOR CONTROL UTILIZING INDEPENDENT PHASE PARAMETERS

(75) Inventors: Boris A. Maslov, Reston, VA (US); Matthew G. Feemster, Chantilly, VA (US); Zareh Soghomonian, Sterling, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 11 days.

(21) Appl. No.: 10/173,610

(22) Filed: Jun. 19, 2002

(51) Int. Cl.$^7$ .............................................. H02P 29/00
(52) U.S. Cl. ....................... 318/138; 318/724; 318/439; 310/259
(58) Field of Search ................... 318/254, 138, 318/439, 720, 721, 722, 723, 724; 310/216, 218, 259, 219, 156.12, 156.13

(56) References Cited

U.S. PATENT DOCUMENTS

| | | | |
|---|---|---|---|
| 4,492,903 A | | 1/1985 | Knight et al. |
| 4,546,293 A | * | 10/1985 | Peterson et al. ............. 318/254 |
| 4,670,698 A | * | 6/1987 | Fulton et al. ................ 318/802 |
| 4,754,207 A | | 6/1988 | Heidelberg et al. |
| 4,814,677 A | * | 3/1989 | Plunkett ..................... 318/254 |
| 5,034,675 A | | 7/1991 | Nerowski et al. |
| 5,038,090 A | * | 8/1991 | Kawabata et al. ........... 318/721 |
| 5,227,702 A | * | 7/1993 | Nahirney ..................... 318/138 |
| 5,258,697 A | | 11/1993 | Ford et al. |
| 5,365,137 A | | 11/1994 | Richardson et al. |
| 5,485,491 A | | 1/1996 | Salnick et al. |
| 5,569,994 A | * | 10/1996 | Taylor et al. ................ 318/700 |
| 5,583,411 A | * | 12/1996 | Kusano et al. ............... 318/719 |
| 5,834,918 A | * | 11/1998 | Taylor et al. ................ 318/601 |
| 6,002,234 A | * | 12/1999 | Ohm et al. ................... 318/729 |
| 6,034,493 A | | 3/2000 | Boyd et al. |
| 6,091,216 A | | 7/2000 | Takahashi et al. |
| 6,373,211 B1 | | 4/2002 | Henry et al. |
| 6,384,496 B1 | | 5/2002 | Pyntikov et al. |
| 6,465,975 B1 | * | 10/2002 | Naidu ........................ 318/430 |

FOREIGN PATENT DOCUMENTS

| | | |
|---|---|---|
| DE | 196 03 492 | 8/1996 |
| DE | 197 04 576 A1 | 8/1998 |
| EP | 0 006 669 A1 | 1/1980 |
| EP | 0 866 547 A1 | 9/1998 |
| WO | WO 90/11641 | 10/1990 |

OTHER PUBLICATIONS

"Improved Reliability in Solid–State AC Drives by Means of Multiple Independent Phase–Drive Units", Thomas M. Jahns, IEEE Transactions on Industry Applications, vol. IA–16, No. 3, May/Jun. 1980, pp. 321–331.

Wijenakake, A H et al, "A DSP–based position sensor elimination method with an on–line parameter identification scheme for permanent magnet synchronous motor drivers" Industry Applications Conference, New York 1995, Oct. 8, 1995, pp. 207–215.

* cited by examiner

Primary Examiner—Jonathan Salata
Assistant Examiner—Eduardo Colon Santana
(74) Attorney, Agent, or Firm—McDermott, Will & Emery

(57) ABSTRACT

A control system for a multiphase permanent magnet motor compensates for physical variations among individual motor phase circuit elements. The control system successively develops a control voltage for switched energization of the motor phase windings that is closely matched with particular parameters of the corresponding windings. The system can be applied to a motor in which each stator phase component comprises a ferromagnetically isolated stator electromagnet, the electromagnet core elements being separated from direct contact with each other and formed with separate phase windings. A digital signal processor may be utilized that applies an algorithm incorporating the parameters as constant values, the parameters for a particular phase being accessed for generating the appropriate control signals for energizing that phase.

12 Claims, 5 Drawing Sheets

PRECISION BRUSHLESS MOTOR CONTROL UTILIZING INDEPENDENT PHASE PARAMETERS

RELATED APPLICATION

This application contains subject matter related to U.S. application Ser. No. 09/826,423 of Maslov et al., filed Apr. 5, 2001, U.S. application Ser. No. 09/826,422 of Maslov et al., filed Apr. 5, 2001, U.S. application Ser. No. 09/966,102, of Maslov et al., filed Oct. 1, 2001, and U.S. application Ser. No. 09/993,596 of Pyntikov et al., filed Nov. 27, 2001, all commonly assigned with the present application. The disclosures of these applications are incorporated by reference herein.

FIELD OF THE INVENTION

The present invention relates to rotary electric motors, more particularly to the precise control of brushless permanent magnet motors.

BACKGROUND

The above-identified copending patent applications describe the challenges of developing efficient electric motor drives for vehicles, as a viable alternative to combustion engines. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved. The use of permanent magnets in conjunction with such windings is advantageous in limiting current consumption.

In a vehicle drive environment it is highly desirable to attain smooth operation over a wide speed range, while maintaining a high torque output capability at minimum power consumption. Motor structural arrangements described in the copending applications contribute to these objectives. Electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects with other electromagnet members.

Precision controlled performance within brushless motor applications involves the fusion of nonlinear feedforward compensation coupled with current feedback elements. However, feedforward compensation expressions typically rely heavily upon various circuit parameters, such as phase resistance, phase self-inductance and the like, which are depicted illustratively in the equivalent circuit diagram for an individual motor phase in FIG. 1. $V_t(t)$ denotes the per-phase voltage input, $R_t$ denotes the per-phase winding resistance, and $L_t$ represents the per-phase self-inductance. $E_t(t)$ represents the opposing back-emf voltage of the motor per phase and can be approximated by the following expression:

$$E_i = (K_{ei}\omega)\sin(N_r\theta_t)$$

where $K_{ei}$ denotes the per-phase back-emf voltage coefficient, $\omega(t)$ represents the rotor velocity, $N_r$ denotes the number of permanent magnet pairs, and $\theta_i(t)$ represents the relative displacement between the $i^{th}$ phase winding and a rotor reference position.

Due to phenomena affected by mechanical/manufacturing tolerances and other structural characteristics, each motor phase will exhibit a range of values for each circuit element. Factors that can affect the magnitudes of the circuit parameters include: the net flux linkage of the electromagnet core; fluctuations in the inductance of the core with respect to the electrical circuit; variations in the resistance of the phase winding due to changes in manufacturing tolerances such as the cross sectional area and winding tension; variations in the permeability of the core (related to the grade and the processing and finishing history of the material); phase winding technique (uniform or scrambled wound) or the build quality of the coils on each stator core; position of the electromagnet and permanent magnet interaction (i.e., permeance of the magnetic circuit); variations in the air gap flux density, which is dependent on the permanent magnet rotor magnet sub assembly; residual magnetic flux density; biasing magnetic field due to external magnetic fields; shape of coil wire (rectangular, circular or helical); winding factor achieved in the coil; manufacturing tolerances achieved in the core geometry which could alter the cross sectional tolerance of the core; the effective length over which the coil is wound.

Typically, motor control strategies assume uniformity of parameter values over the entire motor. One median parameter value is taken to represent all corresponding circuit elements of the motor. This lumped parameter approach often leads to degradation in tracking performance due to over/under compensation of the control strategy due to parameter value mismatch within individual phase compensation routines. Such assumed parameters are prone to even greater discrepancies with stator structures configured as autonomous ferromagnetically isolated core components. Thus, the need exists for an individualized circuit parameter compensation that accounts for the parameter variations in the separate phase windings and stator phase component structures.

DISCLOSURE OF THE INVENTION

The present invention fulfills this need, while maintaining the benefits of the separated and ferromagnetically isolated individual stator core element configurations such as disclosed in the copending applications. The ability of the present invention to implement a control strategy that compensates for individual phase circuit elements offers a higher degree of precision controllability since each phase control loop is closely matched with its corresponding winding and structure. This ability is obtained, at least in part, by establishing in a control system for a multiphase motor one or more sets of parameters, the parameters of each set specifically matched with characteristics of a respective stator phase. Successive switched energization of each phase winding is governed by a controller that generates signals in accordance with the parameters associated with the stator phase component for the phase winding energized. Such control provides advantages with motors of a variety of construction and can be applied to a motor in which each stator phase component comprises a ferromagnetically isolated stator electromagnet, the electromagnet core elements being separated from direct contact with each other and formed with separate phase windings.

A digital signal processor may be utilized that applies an algorithm incorporating the parameters as constant values, the parameters for a particular phase being accessed for generating the appropriate control signals for energizing that phase. Other parameters are variable in dependence upon selected states of the system, such as position, temperature and other external conditions. Alternatively, the controller may be provided with a separate loop for each phase, each loop executing a control algorithm containing the parameters for the respective phase. The algorithms may contain components based on the current sensed in each phase, the sensed position and speed of the rotor, the sensed conditions received as input signals to the controller.

The present invention is particularly advantageous in applications in which the motor is intended to track a variable user initiated input, such as electric vehicle operation. In response to torque command input signals, per-phase desired current trajectories are selected by the controller in accordance with an expression that includes the particular parameters for each phase.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 2:
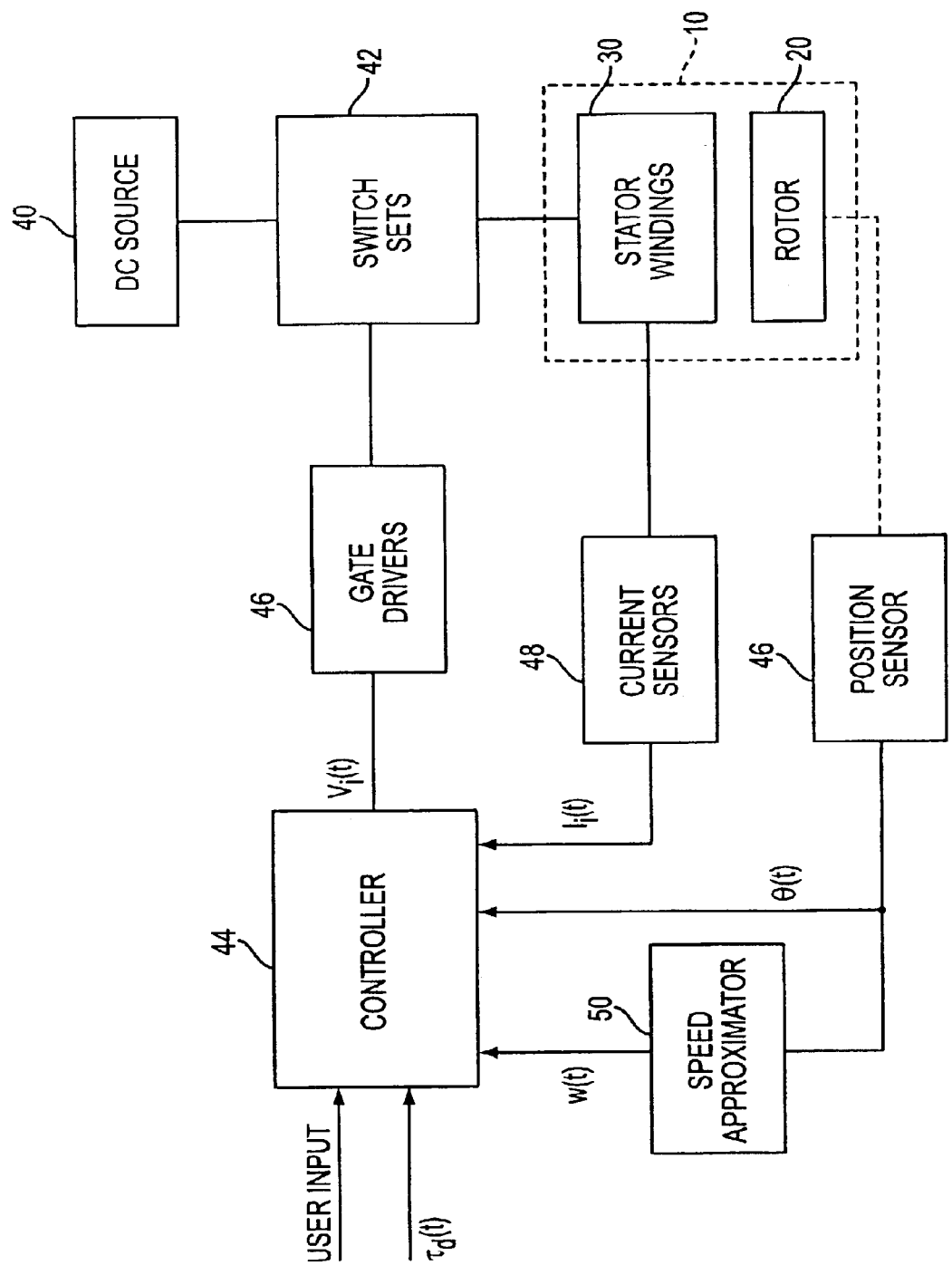
FIG. 2 is a block diagram of a motor control system in accordance with the present invention.

FIG. 2 is a block diagram of a motor control system in accordance with the present invention. Multiphase motor 10 is comprises rotor 20 and stator 30. The stator has a plurality of phase windings that are switchably energized by driving current supplied from d-c power source 40 via electronic switch sets 42. The switch sets are coupled to controller 44 via gate drivers 46. Controller 44 has one or more user inputs and a plurality of inputs for motor conditions sensed during operation. Current in each phase winding is sensed by a respective one of a plurality of current sensors 48 whose outputs are provided to controller 44. The controller may have a plurality of inputs for this purpose or, in the alternative, signals from the current sensors may be multiplexed and connected to a single controller input. Rotor position sensor 46 is connected to another input of controller 44 to provide position signals thereto. The output of the position sensor is also applied to speed approximator 50, which converts the position signals to speed signals to be applied to another input of controller 44.

The sequence controller may comprise a microprocessor or equivalent microcontroller, such as Texas Instrument digital signal processor TMS320LF2407APG. The switch sets may comprise a plurality of MOSFET H-Bridges, such as International Rectifier IRFIZ48N-ND. The gate driver may comprise Intersil MOSFET gate driver HIP40821B. The position sensor may comprise any known sensing means, such as a Hall effect devices (Allegro Microsystems 92B5308), giant magneto resistive (GMR) sensors, capacitive rotary sensors, reed switches, pulse wire sensors including amorphous sensors, resolvers, optical sensors and the like. Hall effect current sensors, such as F.W. Bell SM-15, may be utilized for currents sensors 48. The speed detector 50 provides an approximation of the time derivative of the sensed position signals.

Figure 3:
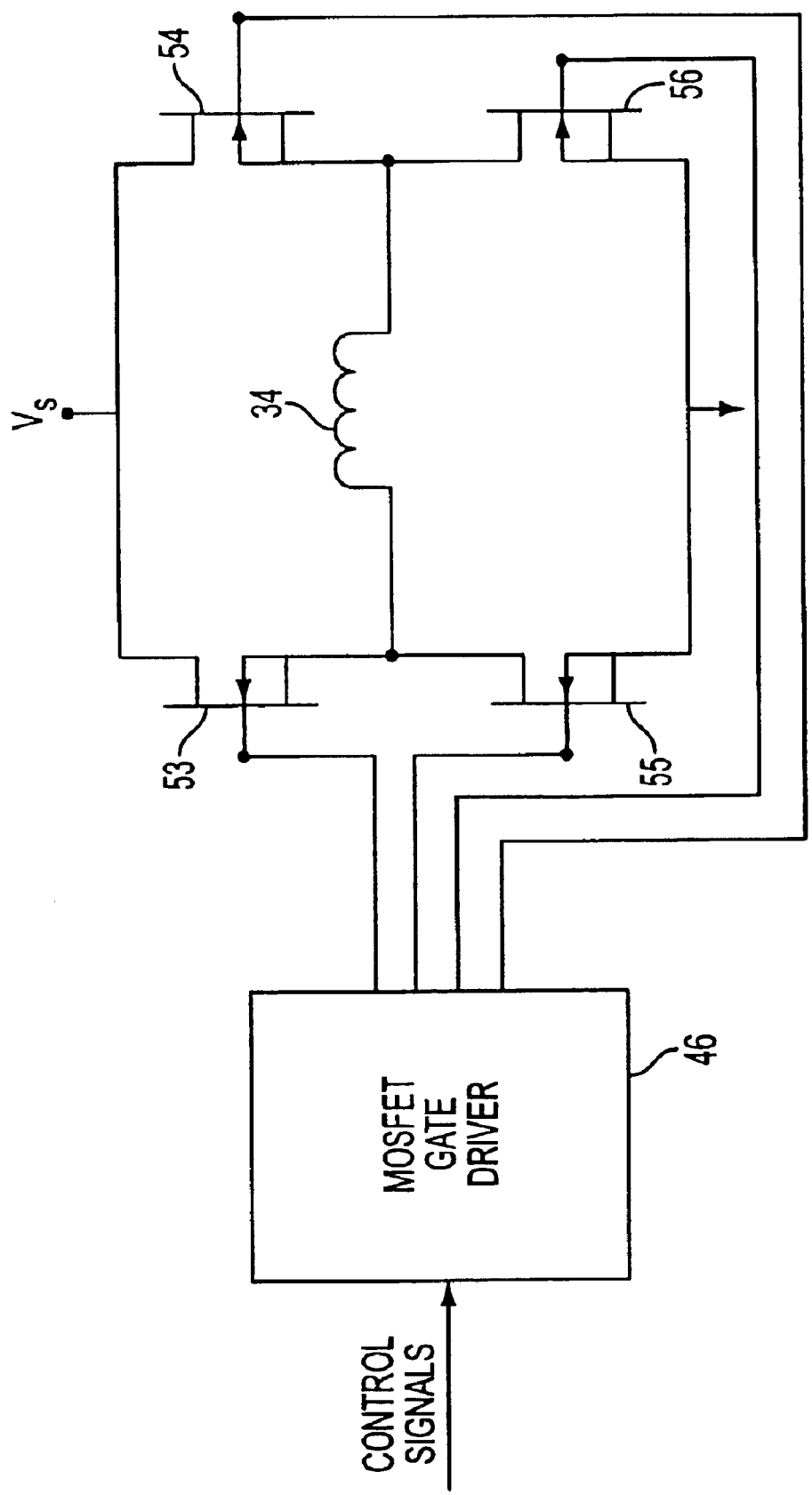
FIG. 3 is a partial circuit diagram of a switch set and driver for an individual stator core segment winding of a motor controlled by the system of FIG. 2.

FIG. 3 is a partial circuit diagram of a switch set and driver for an individual stator core segment winding. Stator phase winding 34 is connected in a bridge circuit of four FETs. It is to be understood that any of various known electronic switching elements may be used for directing driving current in the appropriate direction to stator winding 34 such as, for example, bipolar transistors. FET 53 and FET 55 are connected in series across the power source, as are FET 54 and FET 56. Stator winding 34 is connected between the connection nodes of the two series FET circuits. Gate driver 46 is responsive to control signals received from the sequence controller 44 to apply activation signals to the gate terminals of the FETs. FETs 53 and 56 are concurrently activated for motor current flow in one direction. For current flow in the reverse direction, FETs 54 and 55 are concurrently activated. Gate driver 46 alternatively may be integrated in sequence controller 44.

Figure 4:
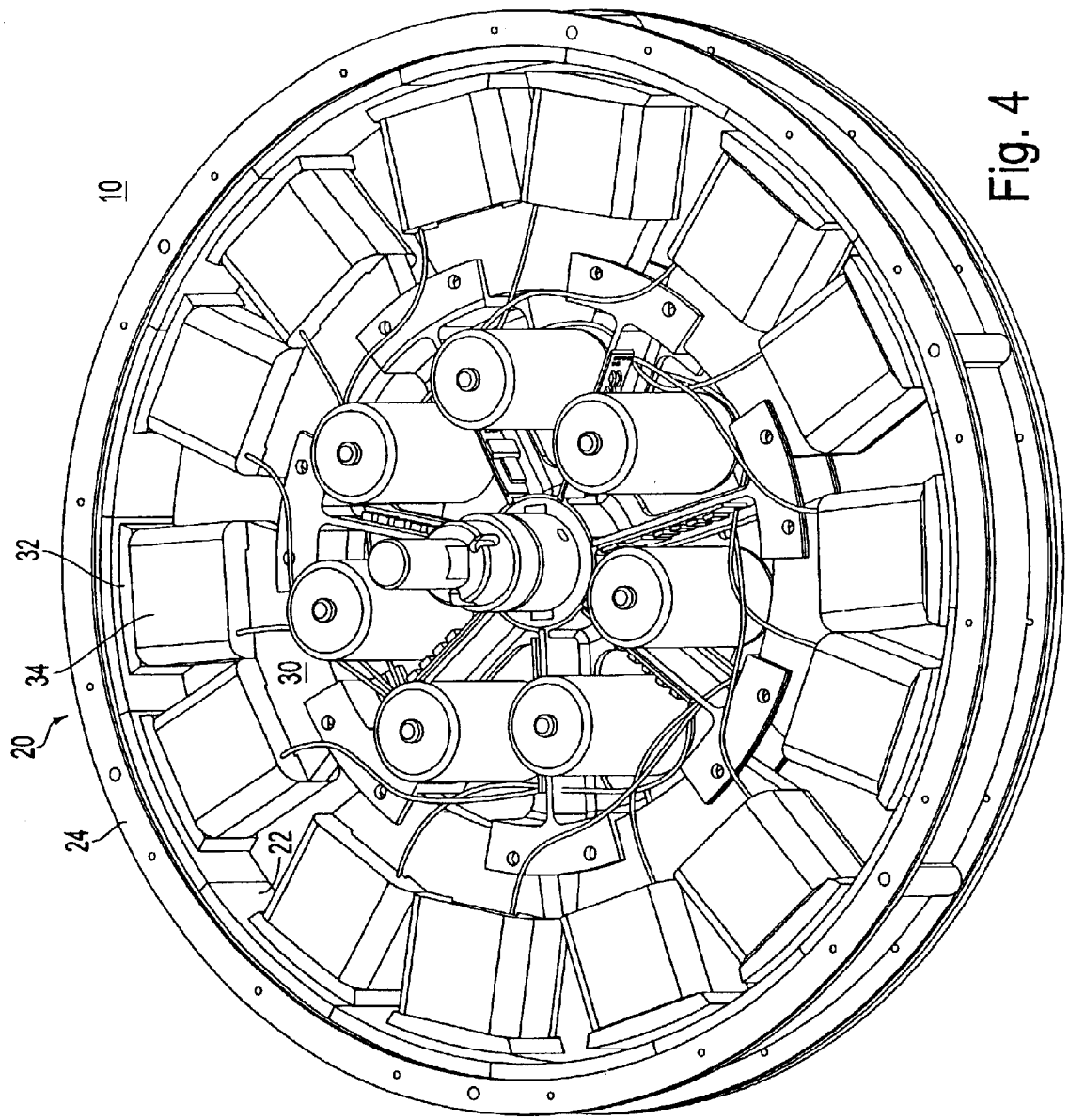
FIG. 4 is a three-dimensional cutaway drawing of motor structure suitable for use in the control system of FIG. 2.

The motor of the present invention is suitable for use in driving a vehicle wheel of an automobile, motorcycle, bicycle, or the like. FIG. 4 is a cutaway drawing of the motor structure that can be housed within a vehicle wheel, the stator rigidly mounted to a stationary shaft and surrounded by a rotor for driving the wheel. The motor 10 comprises annular permanent magnet rotor 20 separated from the stator by a radial air gap. The rotor and stator are configured coaxially about an axis of rotation, which is centered in the stationary shaft. The stator comprises a plurality of ferromagnetically isolated elements, or stator groups. Core segments 32, made of magnetically permeable material separated from direct contact with each other, have respective winding portions 34 formed on each pole. In this example, seven stator groups arc shown, each group comprised of two salient electromagnet poles allocated circumferentially along the air gap. The rotor comprises a plurality of permanent magnets 22, circumferentially distributed about the air gap and affixed to an annular back plate 24. Reference is made to the Maslov et al. application Ser. No. 09/966,102, discussed above, for a more detailed discussion of a motor embodying this construction. It should be appreciated, however, that the vehicle context is merely exemplary of a multitude of particular applications in which the motor of the present invention may be employed. The concepts of the invention, more fully described below, are also applicable to other permanent magnet motor structures, including a unitary stator core that supports all of the phase windings.

In the vehicle drive application example, one of the user inputs to the controller represents required torque indicated by the user's throttle command. An increase in throttle is indicative of a command to increase speed, which is realized by an increase in torque. Another external input to the controller processor may include a brake signal that is generated when the driver operates a brake pedal or handle.

The processor may respond by immediately deactivating the motor drive or, instead, vary the drive control to reduce torque and speed. A separate external deactivation signal can be applied to immediately respond to the driver's command.

Figure 5:
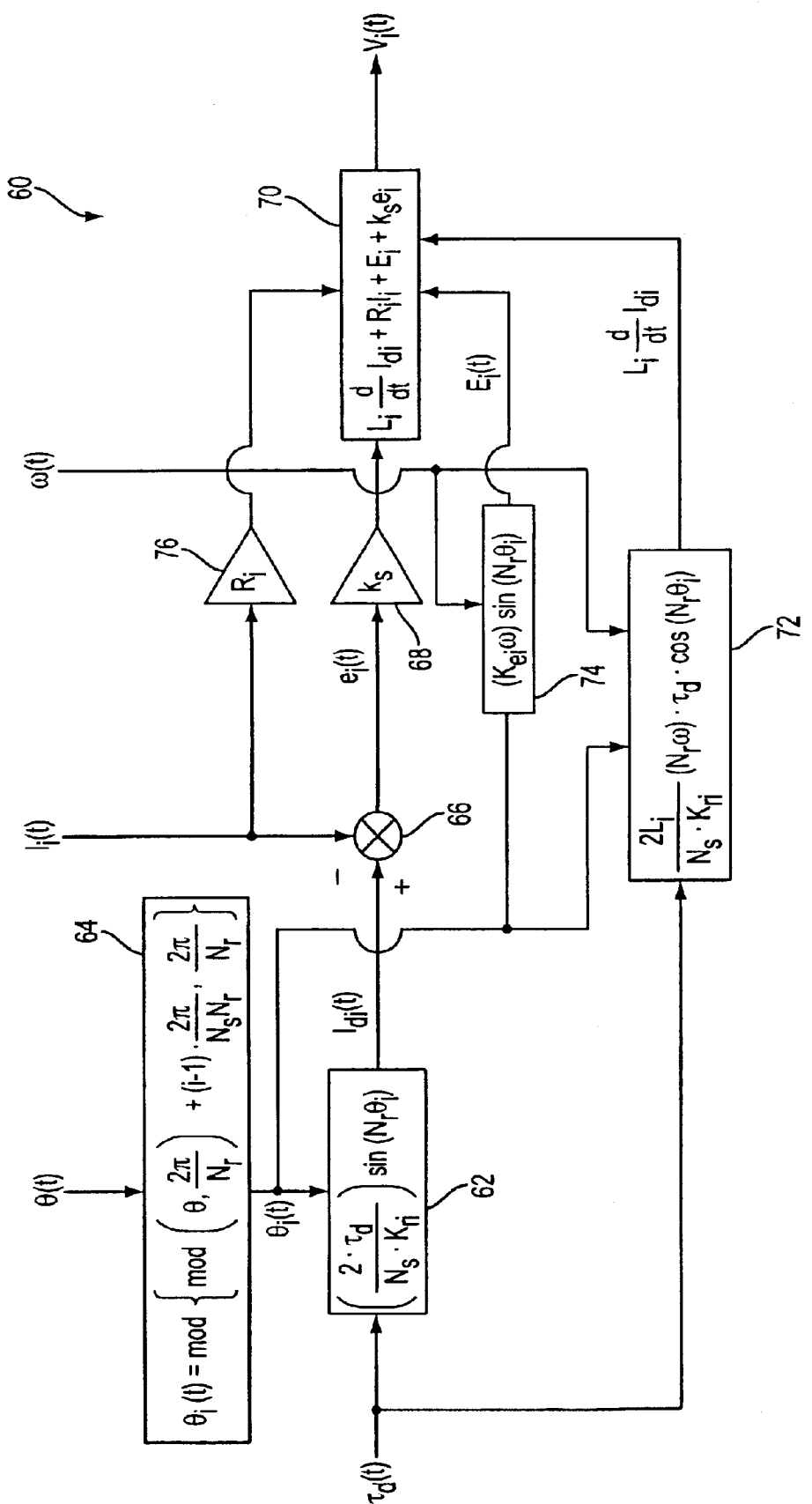
FIG. 5 is a block diagram that illustrates torque controller methodology for use in the control system of FIG. 2.

The control system torque tracking functionality should maintain steady state operation for a constant input command through varying external conditions, such as changes in driving conditions, load gradient, terrain, etc. The control system should be responsive to the driver's throttle input to accurately and smoothly accommodate changes in torque commands. FIG. 5 is a block diagram that illustrates torque controller methodology using feedforward compensation expressions that take into account sensed motor operation conditions as well as individual circuit parameter values to obtain these objectives. For precision torque tracking, the per-phase desired current trajectories are selected according to the following expression:

$$I_{di} = \left(\frac{2\tau_d}{N_s K_{\tau 1}}\right) \sin(N_\tau \theta_1)$$

where $I_{d1}$ denotes per-phase desired current trajectory, $\tau_d$ denotes the user's requested torque command, $N_t$ represents the total number of phase windings, $K_t$ denotes a per-phase torque transmission coefficient and $\theta_t$ represents relative positional displacement between the $i^{th}$ phase winding and a rotor reference point. The per-phase current magnitude is dependent on the per-phase value of the torque transmission coefficient $K_{\tau t}$.

In order to develop the desired phase currents the following per-phase voltage control expression is applied to the driver for the phase windings:

$$V_i(t) = L_i dI_{d1}/dt + R_i I_i + E_i + k_s e_t$$

FIG. 5 represents the methodology, generally indicated by reference numeral 60, by which the controller derives the components of this voltage control expression in real time, utilizing the torque command input and the signals received from phase current sensors, position sensor and speed detector. The external user requested (desired) torque command $\tau_d(t)$, responsive to the throttle, is input to controller function block 62 and rotor position $\theta$ is input to controller function block 64. Block 64 produces an output representing excitation angle $\theta_t(t)$ based on the rotor position, the number of permanent magnet pole pairs ($N_r$) the number stator phases ($N_s$), and the phase delay of the particular phase. The output of controller function block 64 is fed to controller function block 62. Using the excitation angle input thus received, controller function block 62 determines, in accordance with the expression set forth above, how phase currents are distributed among the $N_s$ phases such that the user requested torque $\tau_d(t)$ is developed by the motor. Controller function block 66 calculates the difference between the desired phase current $I_{dt}(t)$ received from block 62 and the sensed phase current $I_t(t)$ to output a phase current track error signal $e_t(t)$. This error signal is multiplied by gain factor $k_s$ in controller function block 68. The effect of the current feedback gain is to increase overall system robustness via the rejection of system disturbances due to measurement noise and any model parameter inaccuracies. The output of block 68 is fed to controller function block 70. Block 70 outputs time varying voltage signals $V_t(t)$ to the gate drivers 52 for the selective controlled energization of the phase windings 34. $V_t(t)$ has components that compensate for the effects of inductance, induced back-emf and resistance.

To compensate for the presence of inductance within phase windings, the term $LdI_{dt}/dt$, wherein $dI_{dt}/dt$ denotes the standard time derivative of the desired phase current $I_{dt}(t)$, is input to the controller function block 70 to be added in the phase voltage calculation. Determination of $LdI_{dt}/dt$, is made at controller function block 72, acting upon the received inputs of $\tau_d(t)$, $\theta_t(t)$ and $\omega(t)$. To compensate for the induced back-emf voltage the term $E_t$ is added in the phase voltage calculation as an input to function block 70 from controller function block 74. The back-emf compensation value is derived from the excitation angle and speed, received as inputs to block 74 using back-emf coefficient $K_{ei}$. To compensate for voltage drop attributed to phase winding resistance and parasitic resistance, the term $R_t I_t(t)$ is added in the phase voltage calculation as an input to function block 70 from controller function block 76.

In operation, controller 44 successively outputs control signals $V_t(t)$ to the gate drivers for individual energization of respective phase windings. The gate drivers activate the respective switch sets so that the sequence in which windings are selected comports with a sequence established in the controller. The sequence is transmitted to the gate drivers through the link only generally illustrated in the diagram of FIG. 5. Each successive control signal $V_t(t)$ is related to the particular current sensed in the corresponding phase winding, the immediately sensed rotor position and speed, and also to model parameters, $K_{ei}$ and $K_{\tau t}$, that have been predetermined specifically for the respective phases. Thus, for each derived control signal $V_t(t)$, in addition to receiving timely sensed motor feedback signals, the controller must access the parameters specific to the particular phase to which the control signal corresponds. The controller thus has the ability to compensate for individual phase characteristic differences among the various stator phases. To prevent over/under compensation of the voltage control routine, the per-phase circuit parameters utilized are exactly matched to their actual phases values.

The per-phase torque transmission coefficient $K_{\tau t}$ captures the per-phase torque contribution of each phase. This parameter is proportional to the ratio of the effective torque generated per current applied for that phase. The torque developed by the phase is a function of the magnetic flux density developed in the core material of the phase, which produces the effective air gap flux density. The design of the electromagnetic core geometry takes into account current density, which is a function of the ampere-turns on each portion of the core in order to optimize induction in the material without driving the core into saturation. However, the magnetic properties of the core material are often non-homogeneous throughout the stator core. If the motor is configured with separated, ferromagnetically autonomous electromagnet cores, inconsistencies can be even more pronounced. Variations in winding and inductance also contribute in determining the torque constant and the back-emf coefficient parameters. There will be degradation in the effective flux buildup in the core if air pockets are formed in the windings. Although high packing factors can be achieved through uniform winding, there can be variations in wire manufacturing. Thus, if a nominal motor torque transmission coefficient and a nominal back-emf coefficient are utilized by the controller, the variation in properties of the phases produces overall motor output torque ripple. The torque controller methodology represented in FIG. 5 avoids this problem by applying the per-phase torque transmission coefficient and back-emf coefficients predetermined for each phase.

The computations illustrated in FIG. 5 are performed successively in real time. The expression shown in block 62 has been selected to provide the desired currents for tracking torque in the preferred embodiment. This expression can be modified if factors other than precisely tracking changes in torque input commands are also of significance. For example, in some vehicle environments, degree of acceleration and deceleration may be of consideration to avoid unnecessarily rough driving conditions. The expression in block 62 thus can be changed to accommodate additional considerations.

Figure 1:
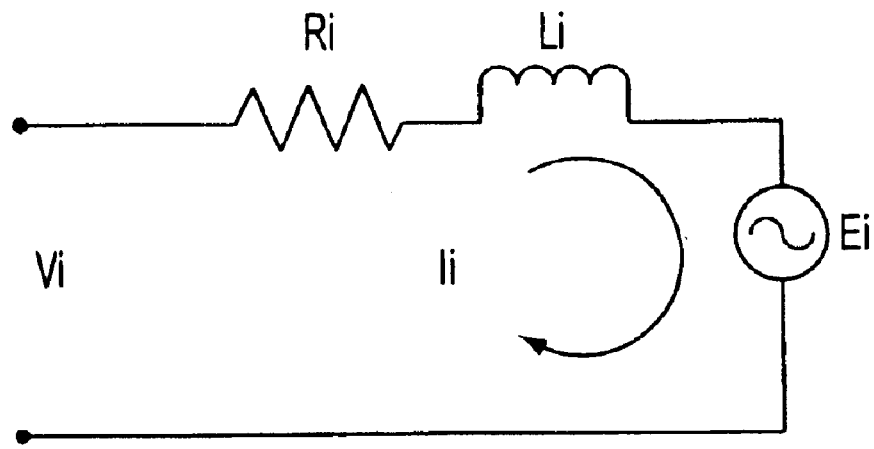
FIG. 1 is an equivalent circuit diagram for an individual motor phase.
Figure 6:
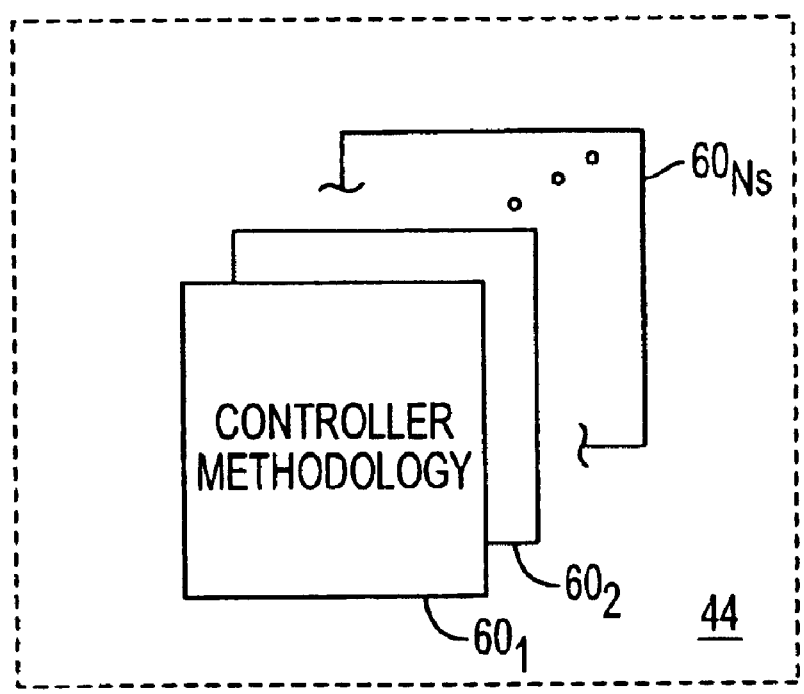
FIG. 6 is a partial block diagram that illustrates a variation of the controller methodology of FIG. 5.

The controller methodology illustrated in FIG. 5 may be performed in an integrated execution scheme in which particular phase parameters are substituted for each generated control voltage output. Alternatively, the controller 44 may provide a separate control loop for each stator phase n, as represented in the partial block diagram of FIG. 6. For each of the $N_s$ motor phases, a corresponding control loop $60_i$ is provided. Each loop contains the relevant parameters for the respective motor phase. The control loops are activated in accordance with the appropriate motor phase energization sequence and need only the sensed motor feedback signals for generation of the control voltages.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, in the control methodology illustrated in FIG. 5, the desired per-phase current $I_{dt}(t)$ can be determined in real time from the received inputs of $\tau_d(t)$, $\theta_r(t)$ by reference to values stored in look-up tables. Look-up tables would be provided for each stator phase.

As can be appreciated, the motor of the invention can be utilized in a wide range of applications in addition to vehicle drives. While it is preferred, in the implementation of a vehicle drive, that the rotor surround the stator, other applications may find advantageous utility with the stator surrounding the rotor. Thus, it is within the contemplation of the invention that each inner and outer annular member may comprise either the stator or rotor and may comprise either the group of electromagnets or group of permanent magnets.

What is claimed is:

1. A control system for a multiphase permanent magnet motor having a plurality of stator phase components and a rotor, each stator phase component comprising a phase winding formed on a core element, said system comprising:
   a plurality of controllable switches, each phase winding connected respectively to one or more of the switches and a power source for selective energization of the phase winding; and
   a controller having stored therein a plurality of control parameters comprising at least one set of control parameters, each set determined specifically for a different respective stator phase component based on physical characteristics thereof;
   wherein phase windings are energized in response to control signals generated by the controller in accordance with the set of control parameters associated with the stator phase component for the phase winding energized; and
   wherein the core element of each stator phase component comprises a ferromagnetically isolated stator electromagnet, the electromagnet core elements being separated from direct contact with each other, and a phase winding formed on each core element.

2. A control system as recited in claim 1, wherein said controller comprises a digital signal processor.

3. A control system as recited in claim 2, further comprising a current sensor coupled to each phase winding and connected to an input of the digital signal processor, wherein each successive control signal is generated by the digital signal processor in relation to a current sensor output derived from the associated phase winding.

4. A control system as recited in claim 1, wherein said one set of control parameters comprises phase-dependent torque transmission coefficients.

5. A control system as recited in claim 4, wherein said control parameters additionally comprise a phase-dependent back-emf coefficient associated with each stator phase.

6. A control system for a multiphase permanent magnet motor having a plurality of stator phase components and a rotor, each stator phase component comprising a phase winding formed on a core element said system comprising:
   a plurality of controllable switches, each phase winding connected respectively to one or more of the switches and a power source for selective energization of the phase winding; and
   a controller having stored therein a plurality of control parameters comprising at least one set of control parameters, each set determined specifically for a different respective stator phase component based on physical characteristics thereof;
   wherein phase windings are energized in response to control signals generated by the controller in accordance with the set of control parameters associated with the stator phase component for the phase winding energized; and wherein said controller is configured with a separate control loop for each stator phase, each phase loop configuration applying the set of parameters for the respective motor phase to generate the control signals for the respective phase winding.

7. A control system as recited in claim 6, further comprising a rotor position sensor having an output coupled to said digital signal processor to provide position signals thereto.

8. A control system as recited in claim 7, wherein a speed signal generator is coupled between the output of the position sensor and the digital signal processor to provide speed signals thereto.

9. A method for real-time continuous control of a multiphase permanent magnet motor having a plurality of stator phase windings, each winding formed on a core element, and a rotor, the method comprising the steps of:
   inputting a command signal to a controller having stored therein a plurality of control parameters comprising at least one set of control parameters, each set determined specifically for a respective stator phase component based on physical characteristics thereof;
   energizing phase windings in response to control signals generated by the controller in accordance with the parameters associated with each respective phase winding to be energized;
   wherein the step of energizing further comprises sensing current in each of the phase windings to be energized and the control signals for energizing each winding are related to the current sensed in the respective winding; and
   wherein the stator comprises a ferromagnetically isolated core element for each phase winding, the core elements being separated from direct contact with each other, and each set of parameters is related to the particular structural attributes of the core element and phase winding.

10. A method as recited in claim 9, further comprising a step of sensing rotor position and wherein the control signals are related to sensed position.

11. A method as recited in claim 9, wherein said one set of control parameters comprises phase-dependent torque transmission coefficients.

12. A method for real-time continuous control of a multiphase permanent magnet motor having a plurality of stator phase windings, each winding formed on a core element, and a rotor, the method comprising the steps of:

inputting a command signal to a controller having stored therein a plurality of control parameters comprising at least one set of control parameters, each set determined specifically for a respective stator phase component based on physical characteristics thereof; and energizing phase windings in response to control signals generated by the controller in accordance with the parameters associated with each respective phase winding to be energized;

wherein said one set of control parameters comprises phase-dependent torque transmission coefficients; and wherein the user initiated command signal represents a desired motor torque and the step of successively energizing phase windings individually tracks the desired torque in accordance with the expression:

$$I_{di} = \left(\frac{2\tau_d}{N_s K_{\tau 1}}\right) \sin(N_\tau \theta_1)$$

where $I_{di}$ denotes per-phase desired current trajectory, $\tau_d$ denotes the user's requested torque command, $N_s$ represents the total number of phase windings, $K_{\tau i}$ denotes a per-phase torque transmission coefficient and $\theta_i$ represents relative positional displacement between the $i^{th}$ phase winding and a rotor reference point.

* * * * *